(12) United States Patent
Stones et al.

(10) Patent No.: US 8,918,951 B2
(45) Date of Patent: Dec. 30, 2014

(54) BLOWER VACUUM DEVICE

(71) Applicant: Black & Decker Inc., Newark (DE)

(72) Inventors: Kevin Stones, Durham (GB); Jonathan Armstrong, Durham (GB)

(73) Assignee: Black & Decker Inc., Newark, DE (US)

( * ) Notice: Subject to any disclaimer, the term of this patent is extended or adjusted under 35 U.S.C. 154(b) by 159 days.

(21) Appl. No.: 13/769,487

(22) Filed: Feb. 18, 2013

(65) Prior Publication Data

US 2013/0212830 A1      Aug. 22, 2013

(30) Foreign Application Priority Data

Feb. 20, 2012   (EP) .................................... 12156246

(51) Int. Cl.
*A47L 5/00*   (2006.01)
*A47L 5/22*   (2006.01)
*A01G 1/12*   (2006.01)

(52) U.S. Cl.
CPC ................. *A47L 5/225* (2013.01); *A01G 1/125* (2013.01)
USPC ................... 15/339; 15/344; 15/330; 15/405

(58) Field of Classification Search
USPC ............................ 15/319, 330, 339, 405, 344
IPC .......................................................... A47L 5/00
See application file for complete search history.

(56) References Cited

U.S. PATENT DOCUMENTS

| | | | |
|---|---|---|---|
| 4,694,528 A * | 9/1987 | Comer et al. ................... | 15/330 |
| 4,798,613 A | 1/1989 | Hetherington et al. | |
| 4,880,364 A | 11/1989 | Berfield et al. | |
| 5,345,649 A | 9/1994 | Whitlow | |
| 5,535,479 A | 7/1996 | Pink et al. | |
| 5,560,078 A | 10/1996 | Toensing et al. | |
| 5,660,493 A | 8/1997 | Stephens | |
| 6,059,541 A | 5/2000 | Beckey et al. | |
| 6,442,790 B1 | 9/2002 | Svoboda et al. | |
| 6,629,818 B2 | 10/2003 | Svoboda | |
| 7,685,673 B2 * | 3/2010 | Kremsler et al. ............... | 15/405 |
| 7,735,188 B2 | 6/2010 | Shaffer | |

* cited by examiner

*Primary Examiner* — David Redding
(74) *Attorney, Agent, or Firm* — John Yun

(57) ABSTRACT

The present invention relates to a blower vacuum device and in particular to a blower vacuum device for use in the collection of garden debris. The device is preferably one which is operable in a blowing mode to generate an air stream for blowing the debris into piles and also operable in a vacuum mode to suck debris into the device.

15 Claims, 11 Drawing Sheets

BLOWER VACUUM DEVICE

CROSS-REFERENCE TO RELATED APPLICATIONS

This application claims priority to EP Patent Application No. EP 12156246.6 filed Feb. 20, 2012, the contents thereof to be incorporated herein by reference in its entirety.

FIELD OF THE INVENTION

The present invention relates to a blower vacuum device and in particular to a blower vacuum device for use in the collection of lawn debris. The device is preferably one which is operable in a blowing mode to generate an air stream for blowing the debris into piles and also operable in a vacuum mode to suck debris into the device.

BACKGROUND OF THE INVENTION

U.S. Pat. No. 7,735,188B discloses a blower vacuum having an air inlet cover and a blower tube both of which attach to a blower housing for operation of the blower vacuum in a blower mode. The air inlet cover may removably attach to both the blower housing and to the blower tube. The air inlet cover and the blower tube have a protrusion which is inserted through a hole in the housing when attached to the housing. The protrusion abuts a button when the air inlet or the blower tube are attached to the housing. When the button is depressed by the protrusion, a switch is closed in an electrical circuit and this permits operation of the electric motor. The switch is arranged in series with a user operated switch.

This means that the impeller, which is driven by the motor, is operable when the button is depressed by the protrusion and the user operated switch is actuated. In this way the user cannot put his hand in near the impeller and accidentally activate the impeller because the air inlet cover or blower tube must be correctly attached to the housing in order for the protrusion to depress the button and start the motor.

However when the attachment is removed the button is exposed via a hole in the housing. This means that there can still be some circumstances whereby the impeller can be operated when the blower tube or the air inlet grill are removed and the impeller is exposed. For example, the button can be depressed if a screwdriver or a similarly shaped object is inserted into the hole. This means that the user could still activate the impeller when their hand is in the vicinity of the exposed impeller.

BRIEF SUMMARY OF THE INVENTION

One aspect of the present invention provides a blower vacuum device comprising: a housing comprising a motor located therein, the motor being operable with a first switch; a fan located in the housing, the fan being drivable by the motor; an attachment which is releasably attachable to the housing and arranged to cover the fan when attached to the housing, the attachment comprising an actuating projection attached to the attachment for actuating the first switch; and an interlock mechanism between the attachment and the housing, the interlock comprising an engageable lug attached to the attachment and a moveable cam surface, the moveable cam surface being mechanically coupled to a blocking plate wherein the blocking plate is moveable between an unblocking position when the engageable lug engages with the moveable cam surface and a blocking position when the engageable lug is not in engagement with the moveable cam surface; wherein the blocking plate prevents the actuating projection from actuating the switch when the blocking plate is in the blocking position.

This means that the blower vacuum provides an electrical safety switch which is actuated by the insertion of an attachment to the housing of the blower vacuum. At the same time the electrical safety switch is covered by a protective barrier. This shields the electrical switch from interference and prevents objects activating the switch when the attachment is not mounted on the blower vacuum housing. Furthermore the blocking plate not only provides a physical barrier from accidental activation of the switch but also stops the user being able to view the switch or the mechanism for activating the switch. This can prevent the user from knowing about the switch and avoid deliberate activation of the switch. In this way the blower vacuum fan cannot be operated when a user or other object are nearby.

Preferably the attachment is an air inlet grill or a vacuum tube. In this way the blocking plate is moveable for all the blower vacuum attachments. Indeed the interlocking mechanism will work irrespective of whether the blower vacuum is in a blow mode or a vacuum mode. Furthermore the interlocking mechanism may be used in a blower only device or a vacuum only device.

Preferably when the actuating projection is actuating the switch, the blocking plate is in the blocking position, thereby preventing removal of the actuating projection. Preferably the blower vacuum device comprises an attachment release button mechanically coupled to the moveable cam surface and for removing the attachment. This means that the blocking plate has as additional purpose of preventing removal of the attachment because the rest state of the blocking plate is a position blocking the path of the actuating projection. In this way when the attachment is mounted to the housing, the actuating protrusion is prevented from moving by the blocking plate. The user can release the attachment from the housing with the release button.

Preferably the blower vacuum device comprises a user actuated switch in electrical series connection with the first switch. This means that the blower vacuum device cannot be operated with firstly the attachment being correctly inserted in the housing and secondly the user operating the user actuated switch. The user is further protected from accidental operation of the fan because not only does the first switch have to actuated, but also the user has to operate a switch as well.

Preferably the moveable cam surface is biased with a spring so the blocking plate is biased towards the blocking position. This means that in a state where the attachment is not attached to the blower vacuum device, the first switch is not accessible.

Preferably the attachment comprises the engageable lug and the housing comprises the moveable cam surface. The housing may comprise receiving slots for receiving the actuating projection and the engageable lugs. Preferably the blocking plate is integral with the moveable cam surface.

Preferably the engageable lugs and the actuating projection are arranged to permit one orientation for the attachment to be releasably attached to the housing. Preferably, the orientation can be determined by ribs and protrusions on the attachment and the reciprocal cavity in the housing. This aids the user inserting the attachment the right way round when mounting the attachment to the housing.

Preferably the blower vacuum device comprises an actuating mechanism for actuating the first switch when mechanically engaged with the actuating projection. Preferably the actuating mechanism comprises a pivoting actuating element arranged to pivot and abut the first switch when the actuating projection mechanically engages the pivoting actuating element. Preferably the pivoting actuating element is arranged to be biased to a position in which the pivoting actuating element does not abut the first switch.

Preferably the first switch may be a microswitch.

Preferably the blower vacuum device comprises circuitry arranged to generate a reverse current to the motor and generate a reverse torque when the motor is in operation and the first switch is actuated and the circuitry detects that the first switch is subsequently not actuated. In this way the blower vacuum device has an electronic braking mechanism which slows the speed of the fan down. This means that the fan can be stopped quickly and the fan can be stopped before the attachment has been removed completely from the housing and exposed the fan.

Embodiments of the present invention aim to address the aforementioned problems and to provide an improved safety interlock.

BRIEF DESCRIPTION OF THE DRAWINGS

Various other aspects and further embodiments are also described in the following detailed description and in the attached claims with reference to the accompanying drawings, in which:

DETAILED DESCRIPTION OF THE INVENTION

Figure 1:
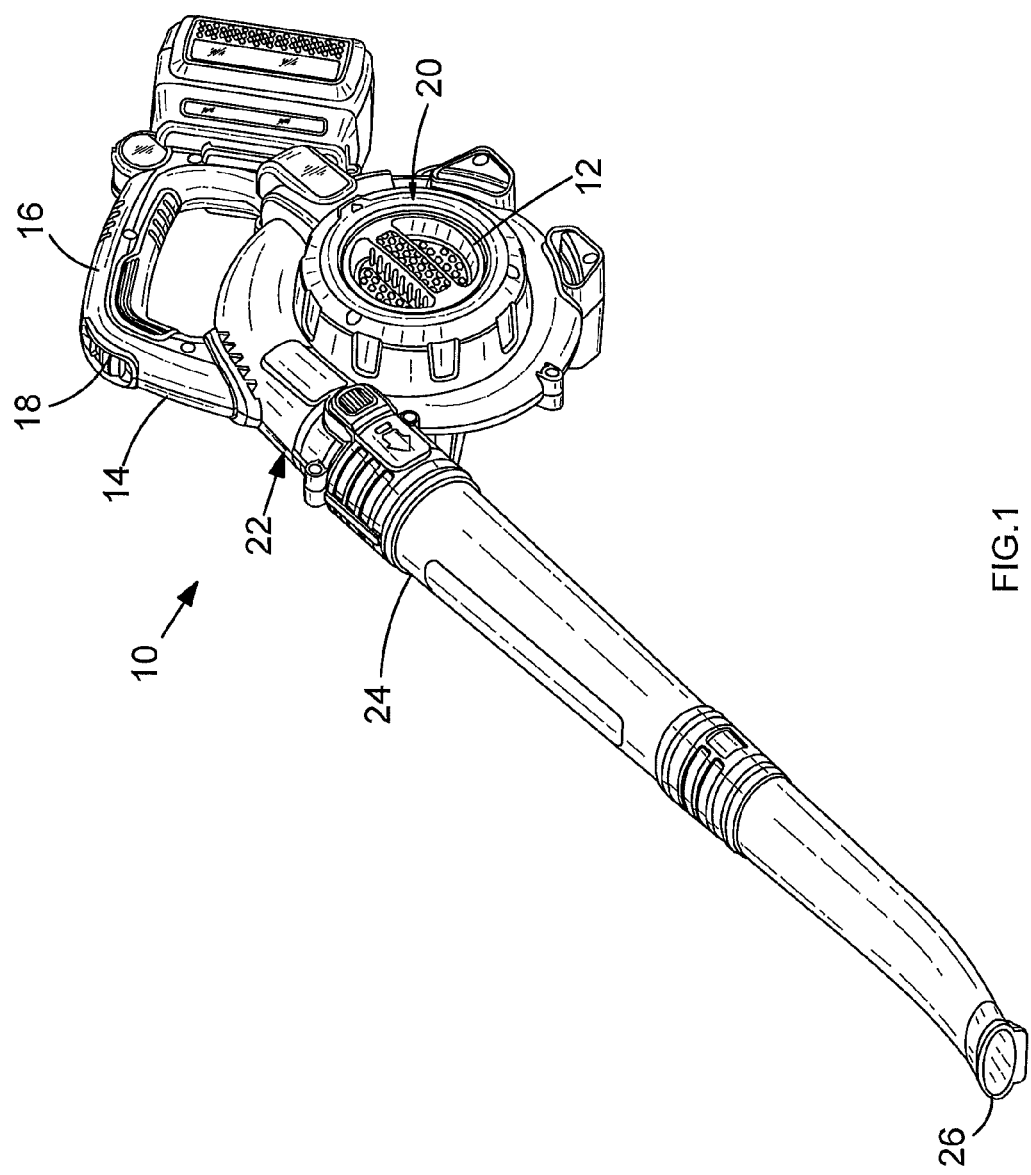
FIG. 1 shows a perspective view of the blower vacuum device in a blower mode.
Figure 2:
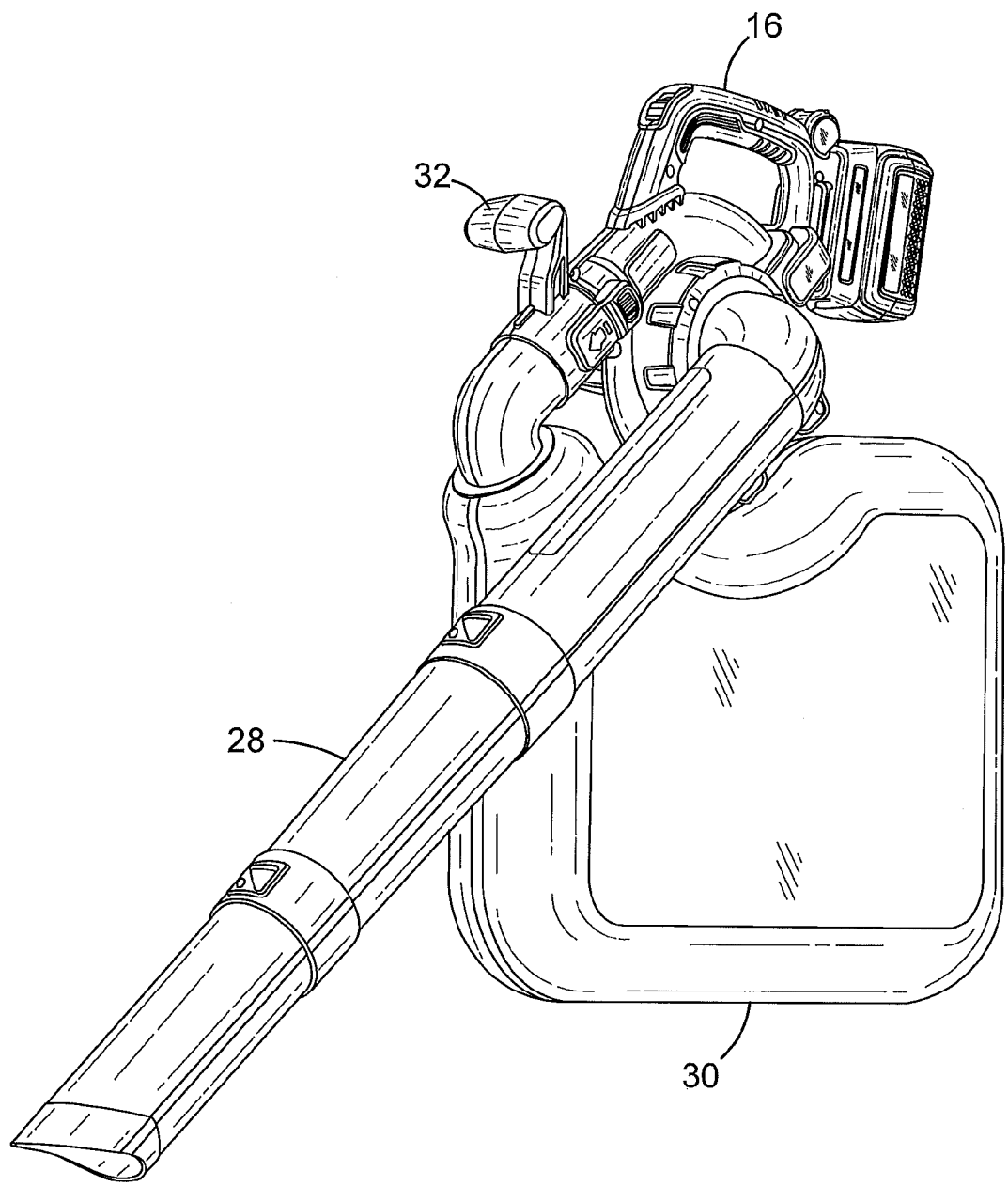
FIG. 2 shows a perspective view of the blower vacuum device in a vacuum mode.

FIG. 1 shows a perspective view of the blower vacuum device 10 in a blower mode. In blower mode the blower vacuum device 10 can generate an air stream which can be used to blow debris into piles. FIG. 2 shows a perspective view of the same blower vacuum device in vacuum mode. In vacuum mode the blower vacuum device can suck the debris into the device.

Referring to FIG. 1, the blower vacuum device in blower mode comprises a housing 14 in which a motor (not shown) is located. The housing 14 comprises a handle 16 which the user grips during operation. When a user operated switch 18 is depressed by a user, a motor is activated which drives a fan or impeller (not shown) via a drive shaft. The fan is located in an involute (not shown) and has an air inlet 20 which is located in front of the fan. The air inlet 20 is covered with a removable air inlet grill 12. The involute also has an outlet 22 located radially of the fan to which a blower tube 24 is attached. The blower tube 24 has a nozzle 26 at an end remote from the outlet 22. When the motor is actuated, the fan rotates and draws air through the air inlet grill 12 and expels air out of the air outlet 22. The air expelled from the outlet 24 travels down the blower tube 24 and is expelled from the nozzle 26. The nozzle 26 is directed towards the ground by a user of the blower vacuum device 10 to direct debris from one place to another.

Referring to FIG. 2, the blower vacuum device 10 is shown in a vacuum mode. In the vacuum mode the air inlet grill 12 is replaced with a vacuum tube 28 and the blower tube 24 is replace with a collection bag 30. In the vacuum mode, the collection bag 30 attachment comprises a front handle 32 to permit two handed operation. When the motor is activated, the fan 14 rotates to draw air and debris into the vacuum tube 28. The air and debris are expelled radially of the fan into the air outlet 22 and the collection bag 30. The collection bag is porous to allow the expelled air to escape from the collection bag 30.

Figure 3:
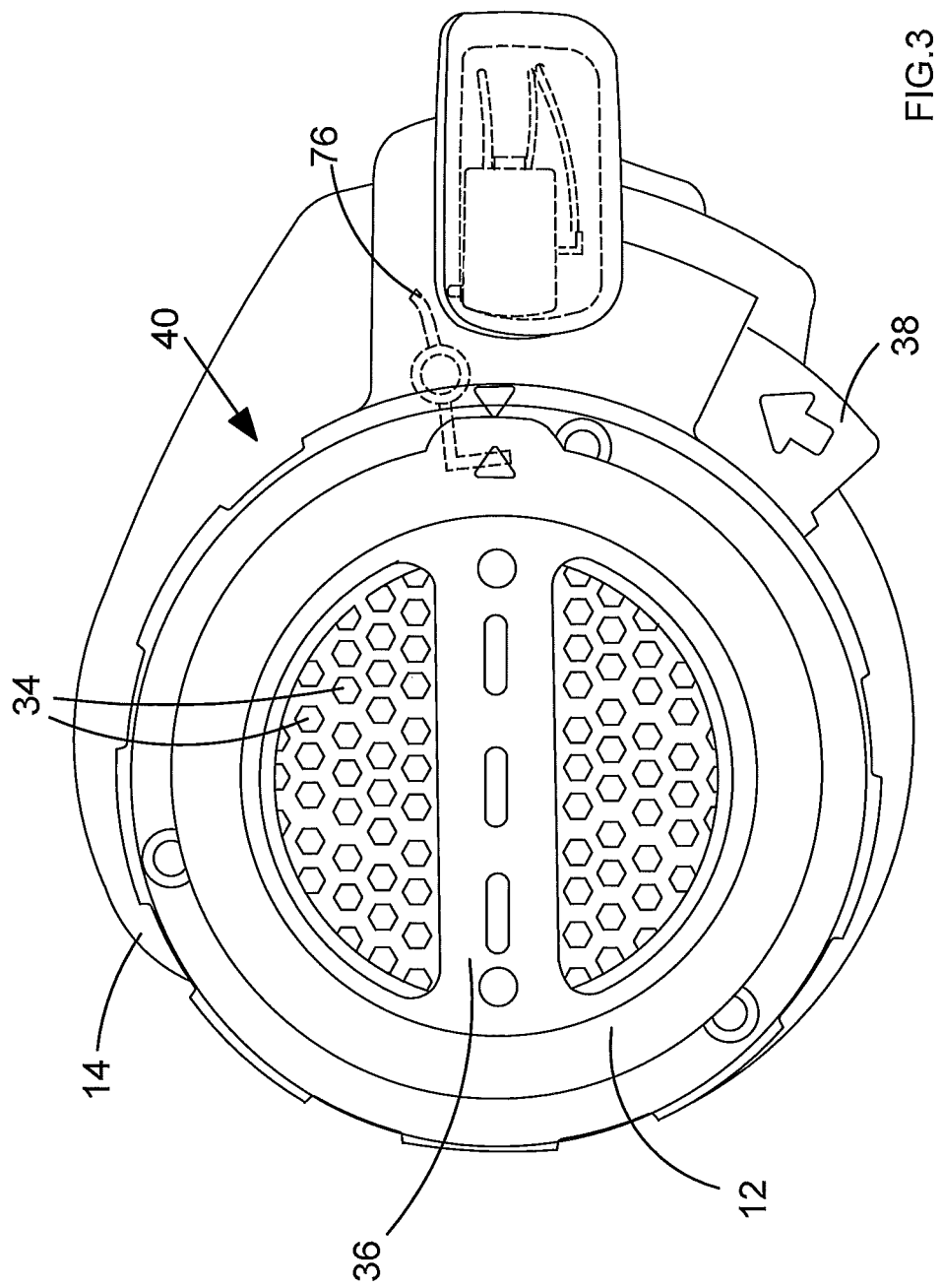
FIG. 3 shows a plan view of the interlock mechanism of the housing with an air inlet grill attached to the housing.

The interlock mechanism used with the blower vacuum device 10 as shown in FIGS. 1 and 2 will now be described. FIG. 3 shows a close up side view of the air inlet grill 12 engaged and mounted on the housing 14 via an interlock mechanism 40. The interlock mechanism 40 is arranged to releasably mount an attachment to the housing 14 of the blower vacuum device 10. The attachment can be an air inlet grill 12 or an vacuum tube 28, depending on whether the blower vacuum device 10 is in blower mode or vacuum mode. The interlock mechanism 40 operates in the same way with the air inlet grill 12 and the vacuum tube 28. The embodiments described hereinafter refer to inserting the air inlet grill 12 into the housing 14. There is also an alternative embodiment whereby the vacuum tube 28 is inserted in to the housing instead.

The air inlet grill 12 comprises a plurality of air holes 34 for drawing air into the blower vacuum device. The air inlet grill also has a handle portion 36 for the user to grip when the air inlet grill is inserted and removed from the housing 14. The interlock mechanism 40 further comprises an attachment release button 38 for releasing either the air inlet grill 12 or the vacuum tube 28 from the housing 14.

Figure 4:
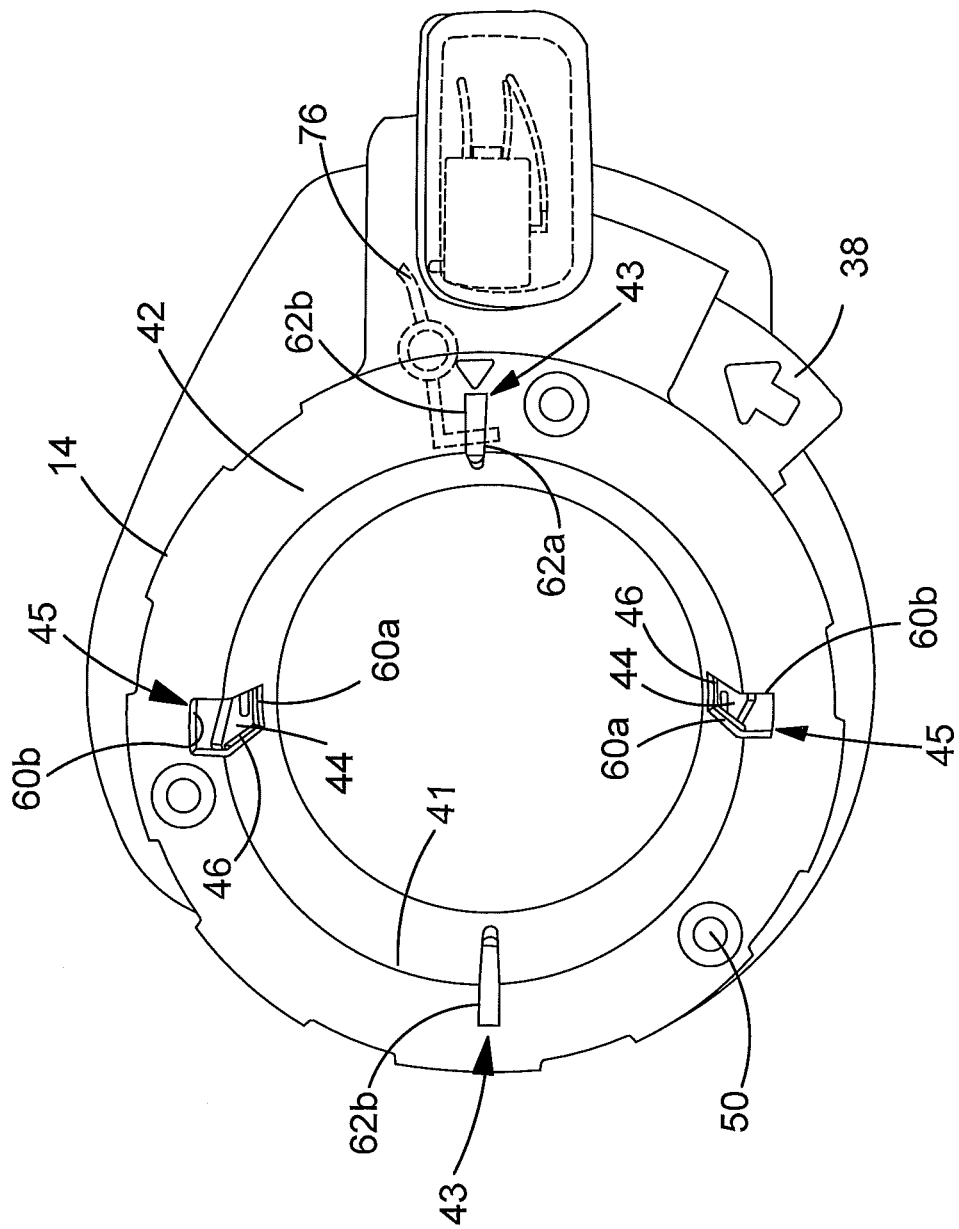
FIG. 4 shows a plan view of the interlock mechanism of the housing without an attachment attached to the housing.

FIG. 4 shows a close up side view of the blower vacuum device 10 of the air inlet 20 without the air inlet grill 12. Although not shown, the fan is located in the centre of the circular hole exposed when the air inlet grill 12 is removed. Typically the axis of rotation of the fan is concentric with the round air inlet 20. The interlock mechanism 40 portion of the housing 14 comprises a cover portion 42, a moveable cam ring 44 and a lower clamshell portion 46.

Figure 5:
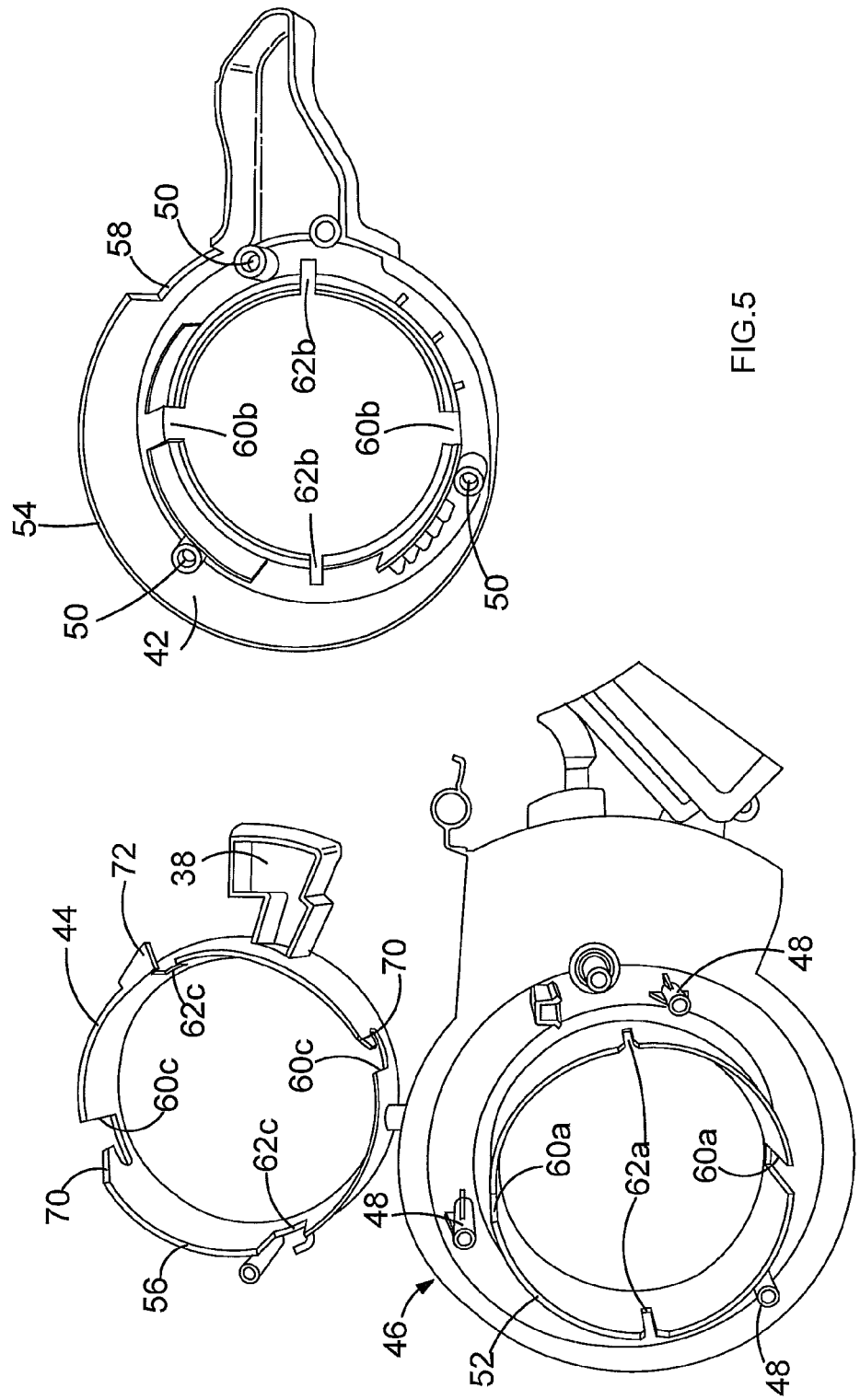
FIG. 5 shows an exploded plan view of the parts of the interlock mechanism of the housing.

The different sections of the interlock mechanism 40 of the housing 14 can be seen in more detail in reference to FIG. 5. The lower clamshell portion 46 is fixed with respect to the cover portion 42 by virtue of a plurality of screws. The screws are threaded through screw holes 50 of the cover portion 42 and are screwed into screw retaining portions 48 on the lower clamshell portion. Alternatively the lower clamshell portion 46 and the cover portion 42 can be fixed using any suitable means.

For the purposes of clarity the underside of the cover portion 42 is shown in FIG. 5. The top side of the lower clam shell portion 46 and the moveable cam ring 44 are also shown in FIG. 5. When fitted together, the moveable cam ring 44 is place around a cylindrical inner wall 52 of the lower clam shell portion 46. The cover portion 42 is then flipped over and placed over the lower clam shell portion 46 and the moveable cam ring 44.

The lower clamshell portion 46 comprises a generally cylindrical inner wall 52 and the cover portion 42 comprises a generally cylindrical outer wall 54. When the lower clamshell portion 46 and the cover portion 42 are fixed together, the inner and outer cylindrical walls 52, 54 define an annular cavity in which the cam ring 44 is arranged to move. The cam ring 44 comprises a generally cylindrical wall 56 having a slightly larger diameter than the inner wall 52. In this way the cylindrical wall 56 is arranged to slide over the inner wall 52 and the cam ring 44 is allowed to move in a circumferential direction around the inner wall 52. At the same time the cam ring 56 fits sufficiently snugly around the inner wall 52 to prevent radial movement and this stops the cam ring rattling during use.

The cam ring 44 comprises the attachment release button 38 for allowing the user to move the cam ring 44. The attachment release button 38 protrudes through the cover portion 42 via a cut way portion 58 of the cover portion 42. The extent of the movement of the cam ring 44 with respect to the fixed cover portion 42 and the lower clamshell portion 46 is limited by the extent to which the attachment release button 38 can move within the cut away portion 58.

Figure 6:
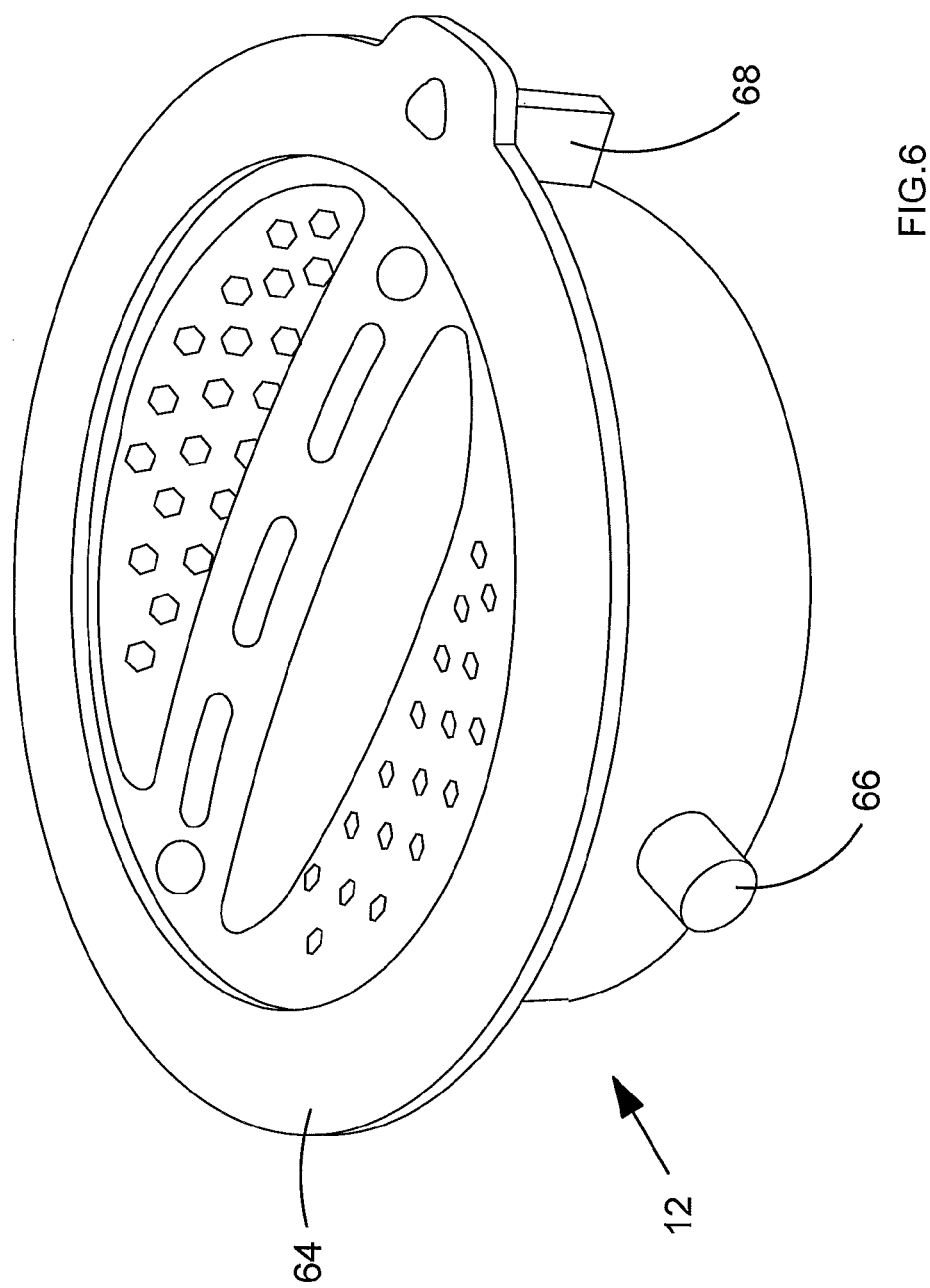
FIG. 6 shows a perspective view of the air inlet attachment.

A brief reference to FIG. 6 will now be made. FIG. 6 discloses a perspective view of the air inlet grill 12. The air inlet grill 12 comprises a flange 64, which abuts against and rotates with respect to a shoulder portion 41 of the cover portion 42 when the air inlet grill 12 is mounted in the housing 14. The air inlet grill 12 comprises a pair of engageable lugs 66 for locating and engaging with the moveable cam ring 44 and the air inlet grill 12 also comprises an actuating projection or actuating rib 68 arranged to actuate a microswitch 78 (shown in FIG. 7).

Turning back to FIG. 5, the cover portion 42 and the lower clamshell portion 46 comprise guide means such as a pair of receiving lug slots 45, to receive the engageable lugs 66 of the air inlet grill 12 (or the vacuum tube 28). The receiving lug slots 45 are defined by first lug slots 60a in the lower clamshell portion 46 and second lug slots 60b in the cover portion 42. In this way the lug slots 45, comprised from the first and second lug slots 60a and 60b respectively, and the lugs 66 provide a bayonet fitting between the air inlet grill and the moveable cam ring 44. The guide means can be any means suitable to guide a portion of the air inlet grill into the housing 14 and the interlock mechanism 40. The cover portion 42 and the lower clamshell portion 46 further respectively comprise another guide means such as a receiving rib slot 43, for receiving the actuating rib 68 of the air inlet grill 12 (or the vacuum tube 28). The receiving rib slot 43 is defined by a first rib slot 62a in the lower clamshell portion 46 and a second rib slot 62b in the cover portion 42. The first and second lug slots 60a, 60b and the first and second rib slots 62a, 62b are aligned when the cover portion 42 is attached to the lower clamshell portion 46 as shown in FIG. 3.

The moveable cam ring 44 comprises a pair of cam ring lug slots 60c for receiving the engageable lugs 66. The cam ring lug slots 60c in the moveable cam ring 44 comprise a camming surface 70 for engaging with the engageable lugs 66 and causing rotational movement of the cam ring 44. The cam ring 44 also comprises a blocking plate 72 for blocking the receiving rib slot 45. The cam ring also comprises cam ring rib slots 62c for receiving the ribs 68. As the moveable cam ring 44 moves, so the blocking plate 72 moves between a blocking position whereby the blocking plate covers the receiving rib slot 45, by covering the first and second rib slots 62a and 62b respectively and an unblocking position wherein the blocking plate does not cover the receiving rib slot 45 by uncovering the first and second rib slots 62a and 62b respectively.

Figure 7:
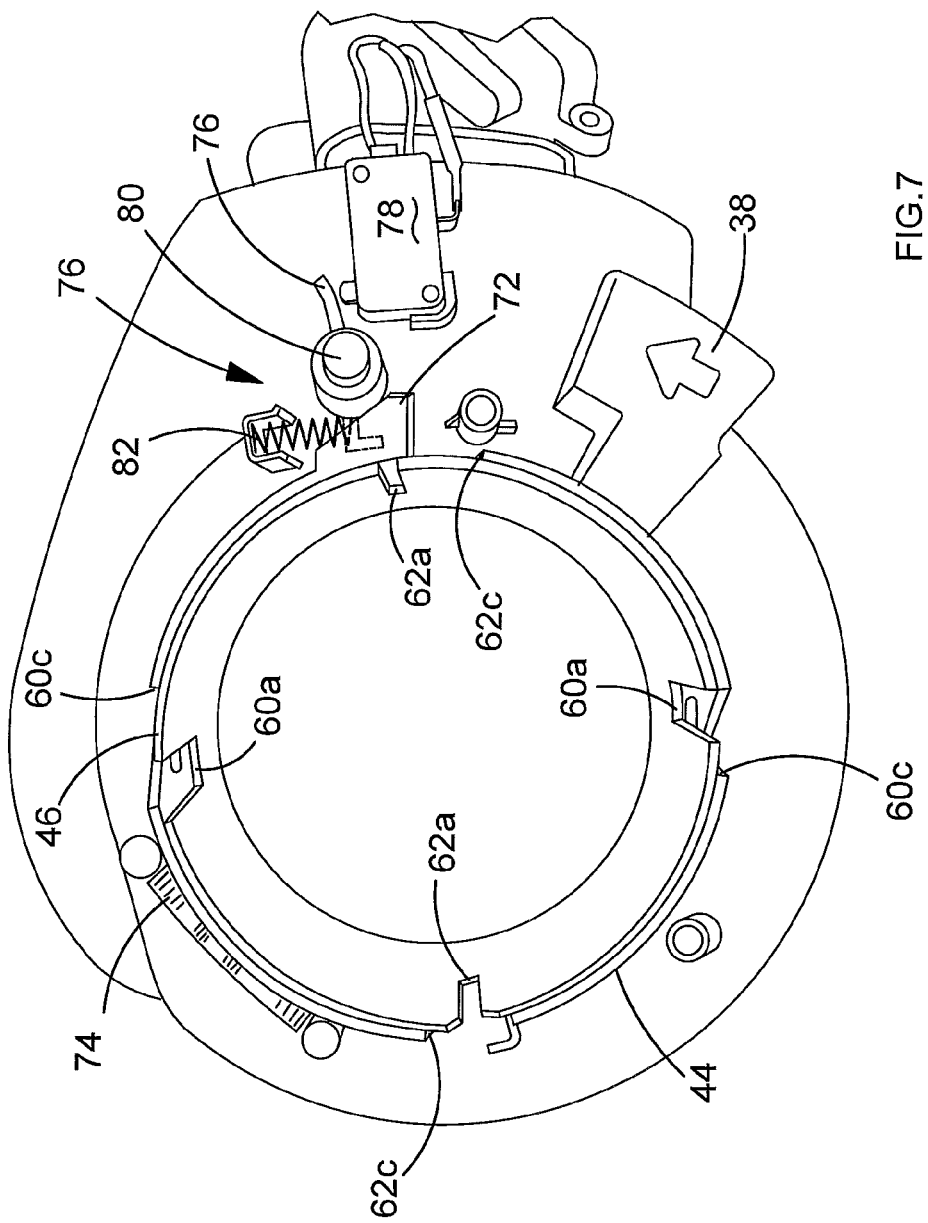
FIG. 7 shows a cut away plan view of the interlock mechanism of the housing.

FIG. 7 shows the moveable cam ring 44 mounted on the lower clamshell portion 46 without the cover portion 42 for the purposes of clarity. The moveable cam ring 44 in the first position is in a position wherein the blocking plate 72 covers the receiving rib slot 43. The cam ring rib slots 62c are aligned with the first rib slots 62a in the lower clamshell portion (although not shown in FIG. 7, the cam ring rib slots 62c are also aligned with the second rib slots 62b in the cover portion 42.) In particular FIG. 7 shows the first rib slot 62a of the lower clamshell portion 46 being blocked by the blocking plate 72. Although not shown, the blocking plate also blocks the second rib slot 62b in the cover portion 42. In this position the actuating rib 68 of the air inlet grill 12 (or the vacuum tube 28) cannot be inserted into the first rib slot 62a. The moveable cam ring 44 can move to a second position whereby the blocking plate 72 is not in a blocking position the blocking plate 72 does not cover the receiving rib slot 43. In particular in the second position the blocking plate 72 does not block the first rib slot 62a and the actuating rib 68 can be inserted into the first rib slot 62a. Although not shown, the blocking plate 72 in the second position is also not blocking the second rib slot 62b in the cover portion 42. The moveable cam ring 44 is biased to the first position by virtue of a cam ring spring 74. The cam ring spring 74 is sufficiently strong to prevent accidental depressing of the attachment release button 38 and prevent unintentional rotation of the cam ring 44. In order for the user to move the cam ring 44, the user depresses the attachment release button 38. The actuator rib 68 of the air inlet grill 12 is arranged to engage with an pivoting actuating element 76 which activates a microswitch 78. The pivoting actuating element 76 pivots about a pin 80 and the pivoting actuating element 76 is biased with an actuator spring 82 to a position whereby the pivoting actuating element does not actuate the microswitch 78.

In this way when the air inlet grill 12 is not inserted, the pivoting actuating element 76 defaults to a position whereby the microswitch 78 is not actuated and the moveable cam ring 44 defaults to a position whereby the receiving rib slot 43 is blocked.

The microswitch 78 is in series with the user activated switch 18 and therefore the motor can only be activated when the both the user activated switch 18 and the microswitch 78 are closed. This further protects the user because the user has to operate the user controlled switch 18 and the attachment has to be mounted on the housing before the fan will operate.

Figure 8A:
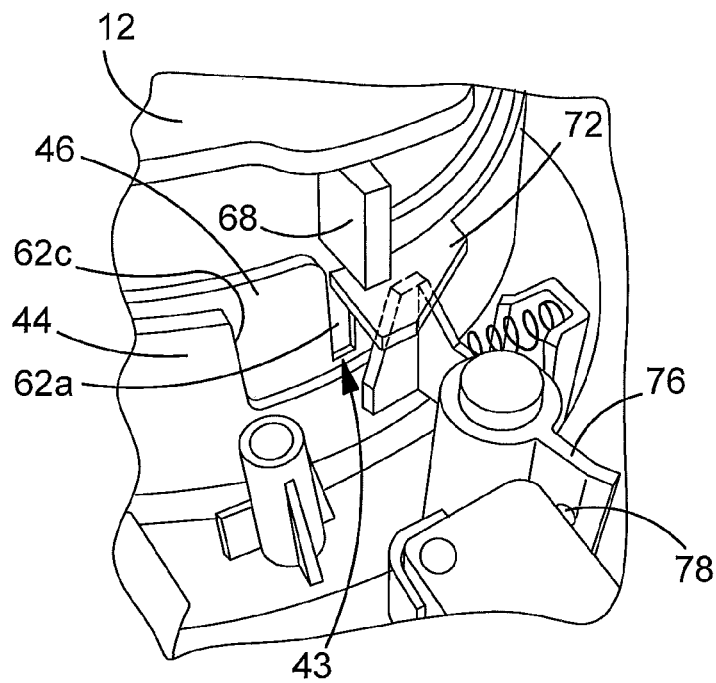
FIGS. 8a, 8b, 8c shows the interlock mechanism operating as the air grill attachment is inserted into the housing.
Figure 8B:
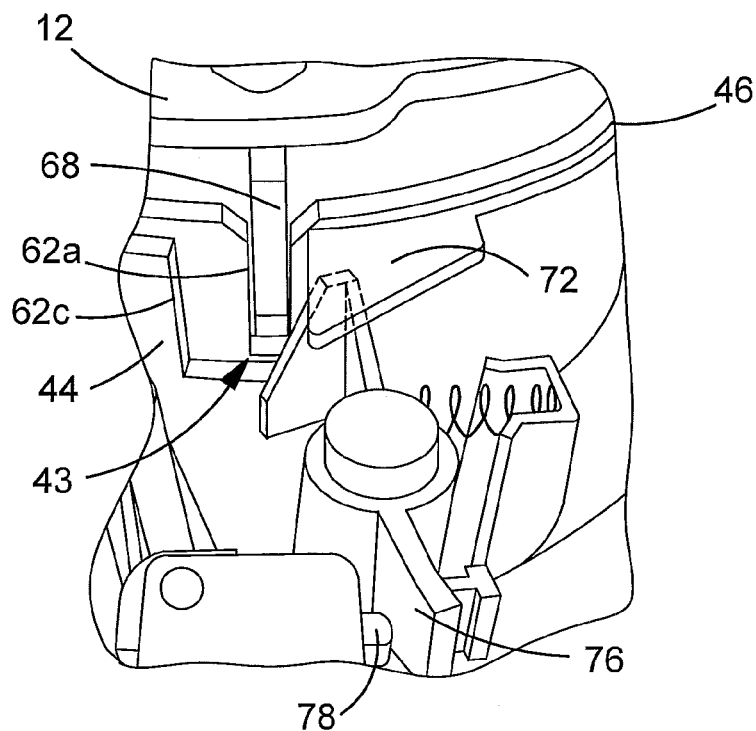
Figure 8C:
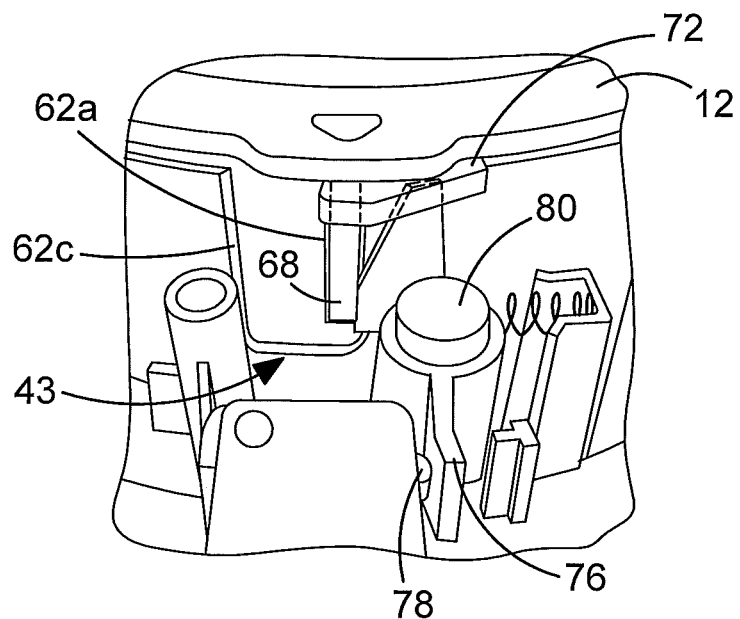
Figure 9A:
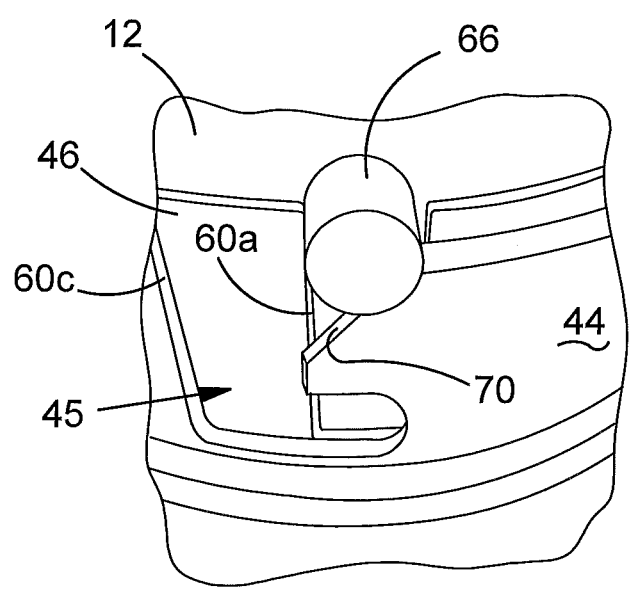
FIGS. 9a, 9b, 9c show the interlock mechanism operating as the air grill attachment is inserted into the housing.
Figure 9B:
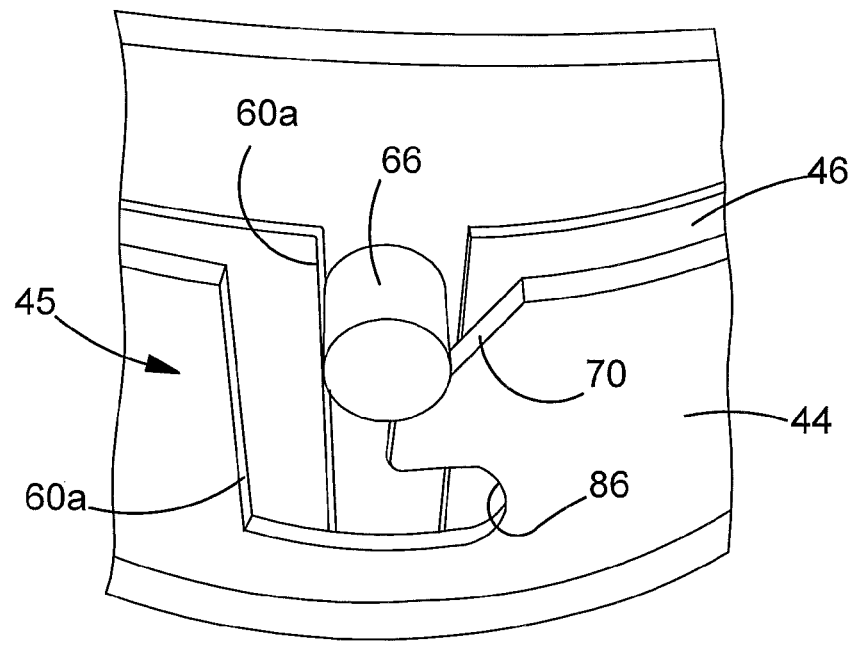
Figure 9C:
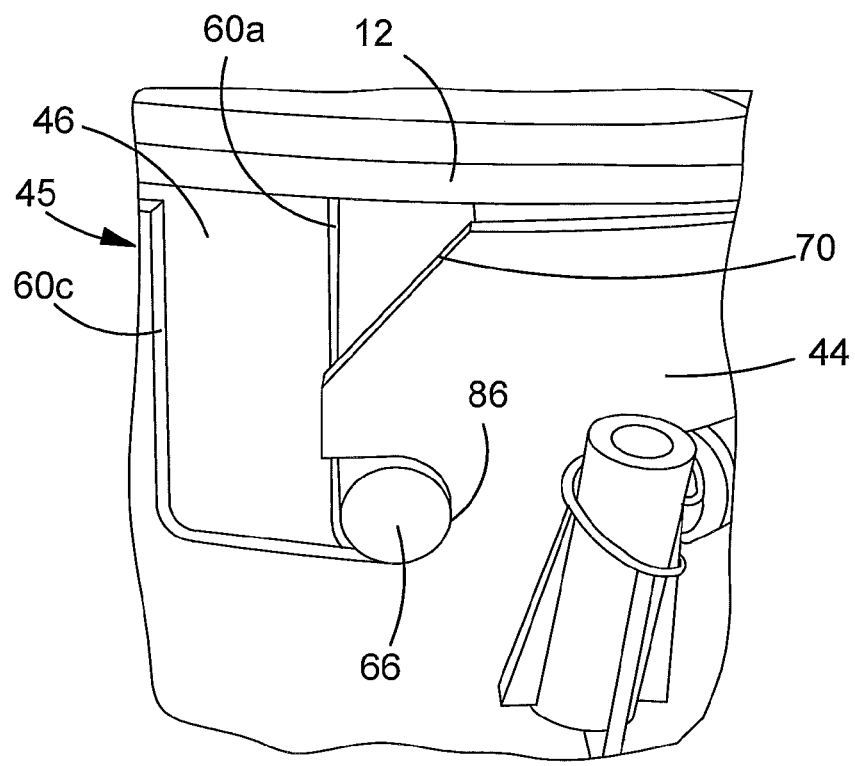
Figure 10:
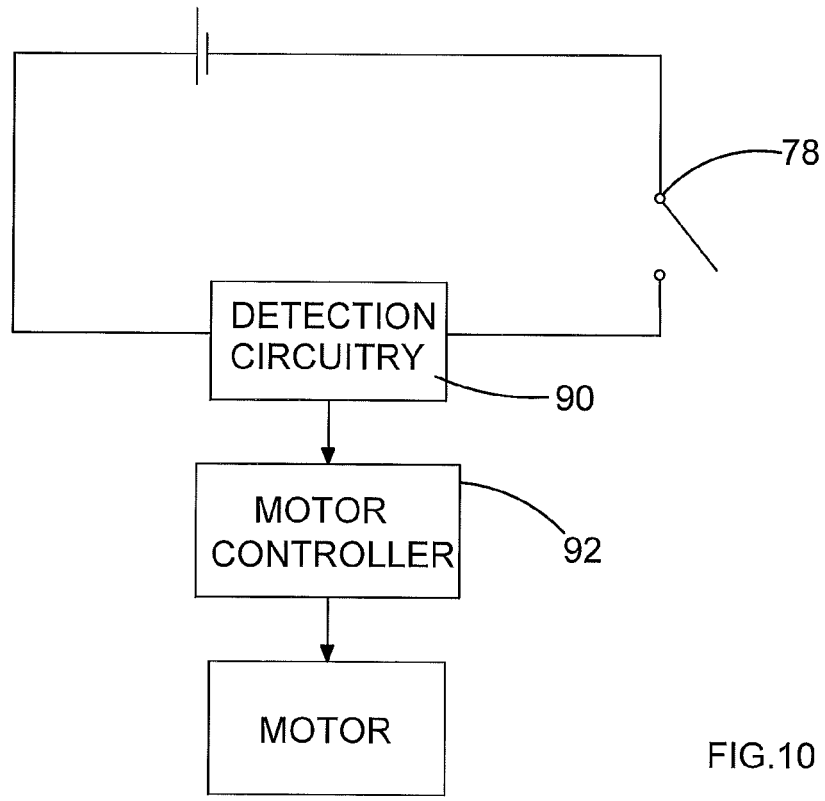
FIG. 10 shows a schematic diagram of the circuitry of the blower vacuum device.

Operation of the interlock mechanism will now be described in reference to FIGS. 8a, 8b, 8c, 9a, 9b and 9c without the cover portion 42 for the purposes of clarity. FIGS. 8a, 8b, 8c show stepwise illustrations of the actuating rib 68 of the air inlet grill 12 being inserted into the receiving rib slot 43. FIGS. 9a, 9b, 9c show stepwise illustrations of the engageable lug 66 being inserted into one of the lug slots 45. The pairs of FIGS. 8a and 9a, 8b and 9b, and 8c and 9c each correspond to same step, albeit showing different parts of the air inlet grill 12 being inserted into the housing 14.

Referring to FIG. 8a, when the air inlet grill 12 is not inserted in the housing 14, the moveable cam ring 44 is in the first position. This means that the blocking plate 72 covers the first rib slot 62a of the lower clamshell portion 46 and the second rib slot 62b of the cover portion 42 and the rib slot 62c of the cam ring. The blocking plate 72 in the first position blocks the actuating rib 68 from being inserted into the first rib slot 62a of the lower clamshell portion 46 and the second rib slot 62b of the cover portion 42 and the rib slot 62c of the cam ring. At the same time the pivoting actuating element 76, is biased to a position whereby the microswitch 78 is not actuated. This means that the actuating rib 68 cannot engage with the pivoting actuating element 76 and the microswitch 78 cannot be activated.

FIG. 9*a*, shows the engageable lug 66 of the air inlet grill 12 in a position before the air inlet grill 12 is inserted into the housing 14. FIG. 9*a* shows the engageable lug 66 is aligned with the receiving lug slot 45 and the engageable lug 66 is aligned with both the first lug slot 60*a* of the lower clamshell portion 42. Although not shown in FIG. 9*a*, the engageable lug 66 is also aligned with the second lug slot 60*b* of the cover portion 42. The moveable cam ring 44 is positioned in the first position such that the camming surface 70 is disposed across the receiving lug slot 45. This means as the engageable lugs 66 are moved down into the first lug slots 60*a* and the second lug slots 60*b* and lug slots 60*c* in the cam ring, the lugs 66 abut against the camming surface 70 and cause rotational movement of the moveable cam ring 44.

FIG. 9*b* shows the engageable lug 66 halfway down the lug slot 60*a* of the lower clamshell portion 46 and halfway down the lug slot 60*c* of the moveable cam ring 44 and the lug 66 has pushed the camming surface 70 out of the way. The rotational movement of the cam ring 44 provided by the engageable lug 66 engaging with the camming surface 70 moves cam ring 44 from the first position to the second position. In this way the blocking plate 72 is moved from the blocking position to the unblocking position. This means the actuating rib 68 can be lowered in the rib slots 60*a*, 60*b*, 60*c* without being impeded by the blocking plate 72.

As the engageable lug 66 is moved further down the lug slot 60*a*, of the lower clamshell portion 46, further down lug slot 60*b* (not shown in FIG. 9*b*) and further down the lug slot 60*c* of the moveable cam ring 44, the engageable lug 66 is no longer is in contact with the camming surface 70. This means that the engageable lug 66 is no longer rotating the moveable cam ring 44. Instead, the lug slot 60*c* of the moveable cam ring has an "L" shape and the slot has an undercutting portion 86 which undercuts the camming surface. In FIGS. 9*a* to 9*c* the moveable cam ring moves from left to right as the engageable lug 66 moves from the top of the lug slot 60 to the bottom of the lug slot 60. At the same time the cam ring spring 74 is urging the moveable cam ring 44 to move from right to left. This means that when the engageable lug 66 moves below the camming surface to the undercutting portion 86, the moveable cam ring 44 snaps back from the second position to the first position as shown in FIG. 9*c*.

At the same time the actuating rib 68 abuts the pivoting actuating element 76 and causes the pivoting actuating element to pivot about the pin 80 and depress the microswitch 78. As the moveable cam ring 44 moves from the second position back to the first position, the blocking plate 72 moves from the unblocking position to the blocking position. This means that the actuating rib cannot be lifted out of the rib slot 62 because the blocking plate is in the way.

In order for the user to remove the air inlet grill 12, the user must depress the attachment release button 38, to move the moveable cam ring 44 and move the blocking plate.

This means that the blower vacuum device cannot be accidently activated by inserting a screwdriver into the slot and thereby activating the microswitch 78. Furthermore the arrangement of the interlock mechanism even prevents a user from deliberately activating the microswitch because the microswitch is covered with the blocking plate. Furthermore when the attachment is removed from the housing, the user requires two hands this means that the user cannot place a hand near the exposed fan.

The camming surface 70 is shaped so that when the engageable lugs 66 engage with the camming surface the cam ring rotates and moves the blocking plate. The lugs 66 abutting against the camming surface 70 provides sufficient rotation of the moveable cam ring 44 such that the actuating rib 68 clears the blocking plate 72 returns to the unblocking position. This is achieved in some embodiments by providing a height of the camming surface 70 in the wall 56 of the moveable cam ring 44 being greater than the height of the actuating rib 68. Furthermore the height of the camming surface 70 may be equal to the height of the actuating rib 68 and the thickness of the blocking plate. This means the blocking plate 72 does not snag on the actuating rib 68 when returning to the blocking position. In addition the extent of the lateral movement of the blocking plate 72 with respect to the actuating rib 68 ensures that the actuating rib 68 misses the blocking plate 72 as the actuating rib 68 is inserted to the rib slots 62. In some embodiments the lateral movement of the blocking plate 72 is achieved by providing a width of the camming surface 70 being equal to or greater than the width of the engageable lugs 66.

Figure 11:
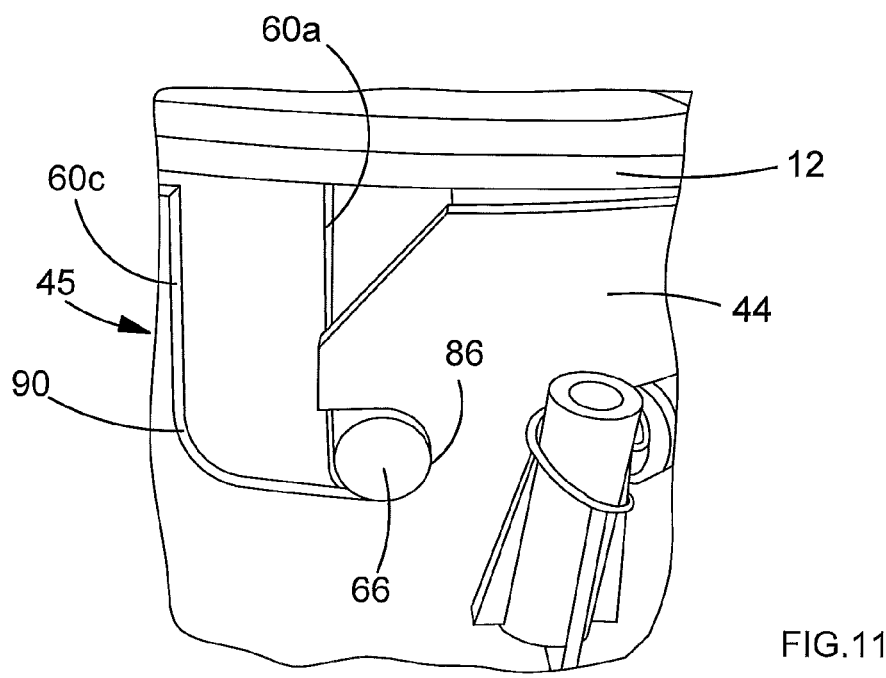
FIG. 11 shows the interlock mechanism with an ejection camming surface.

FIG. 11 shows a further embodiment whereby an ejection camming surface 90 is provided. In this way when the release button 38 is actuated, the moveable cam ring 44 is moved right with respect to the engageable lug 66. In this way the ejection camming surface 90 moves towards the engageable lug 66. When the engageable lug 66 abuts the ejection camming surface 90, the engageable lug 66 and the attachment is force upwards out of the housing.

In some embodiments, the blower vacuum may further comprise detection circuitry 90 for detecting whether the microswitch 78 has been opened. That is the detection circuitry 90 detects if the user has removed an attachment whilst the blower vacuum device 10 is in operation. If the detection circuitry 90 determines that the microswitch 78 changes state from closed to open, the detection circuitry 90 sends a signal to a motor controller module 92. The motor controller module 92 on receiving the signal from the detection circuitry 90, applies braking current to the motor for stopping the fan rotation. This induces an electrical braking torque which opposes the momentum of the fan and motor. In some embodiments the fan is stopped in 700 ms or less. This means that the fan will have stopped before the user can remove the attachment and place their hand near the fan.

Embodiments of the present invention have been discussed with particular reference to the examples illustrated. However it will be appreciated that variations and modifications may be made to the examples described within the scope of the invention. For example interlocking mechanism is not restricted to a blower vacuum device. The interlocking mechanism can be used in a blower only device or a vacuum only device where attachments can be removed to expose a fan.

The invention claimed is:

1. A blower vacuum device comprising:
    a housing comprising a motor located therein, the motor being operable with a first switch;
    a fan located in the housing, the fan being drivable by the motor;
    an attachment which is releasably attachable to the housing and arranged to cover the fan when attached to the housing, the attachment comprising an actuating projection attached to the attachment for actuating the first switch; and
    an interlock mechanism between the attachment and the housing, the interlock mechanism comprising an engageable lug attached to the attachment and a moveable cam surface, the moveable cam surface being mechanically coupled to a blocking plate wherein the blocking plate is moveable between an unblocking position when the engageable lug engages with the moveable cam surface and a blocking position when the engageable lug is not in engagement with the moveable cam surface;

wherein the blocking plate prevents the actuating projection from actuating the switch when the blocking plate is in the blocking position.

2. The blower vacuum device according to claim 1 wherein the attachment is an air inlet grill or a vacuum tube.

3. The blower vacuum device according to claim 1 wherein when the actuating projection is actuating the switch, the moveable cam moves such that the blocking plate moves from the unblocking position to the blocking position, thereby preventing removal of the actuating projection.

4. The blower vacuum device according to claim 1 whereby the blower vacuum device comprises an attachment release button mechanically coupled to the moveable cam surface and for removing the attachment.

5. The blower vacuum device according to claim 1 whereby the blower vacuum device comprises a user actuated switch in electrical series connection with the first switch.

6. The blower vacuum device according to claim 1 whereby the moveable cam surface is biased with a spring so the blocking plate is biased towards the blocking position.

7. The blower vacuum device according to claim 1 whereby the attachment comprises the engageable lug and the housing comprises the moveable cam surface.

8. The blower vacuum device according to claim 1 whereby the housing comprises receiving slots for receiving the actuating projection and the engageable lugs.

9. The blower vacuum device according to claim 1 wherein the blocking plate is integral with the moveable cam surface.

10. The blower vacuum device according to claim 1 wherein the engageable lugs and the actuating projection are arranged to permit one orientation for the attachment to be releasably attached to the housing.

11. The blower vacuum device according to claim 1 comprising an actuating mechanism for actuating the first switch when mechanically engaged with the actuating projection.

12. The blower vacuum device according to claim 11 wherein the actuating mechanism comprises a pivoting actuating element arranged to pivot and abut the first switch when the actuating projection mechanically engages the pivoting actuating element.

13. The blower vacuum device according to claim 12 wherein the pivoting actuating element is arranged to be biased to a position in which the pivoting actuating element does not abut the first switch.

14. The blower vacuum device according to claim 13 wherein the first switch is a microswitch.

15. A blower vacuum device according to claim 1 wherein the blower vacuum device comprises circuitry arranged to generate a reverse current to the motor and generate a reverse torque when the motor is in operation and the first switch is actuated and the circuitry detects that the first switch is subsequently not actuated.

* * * * *